(12) United States Patent
Fujiwara et al.

(10) Patent No.: US 11,789,439 B2
(45) Date of Patent: Oct. 17, 2023

(54) FAILURE SIGN DIAGNOSIS DEVICE AND METHOD THEREFOR

(71) Applicant: Hitachi, Ltd., Tokyo (JP)

(72) Inventors: Junsuke Fujiwara, Tokyo (JP); Hideaki Suzuki, Tokyo (JP); Toshiaki Kono, Tokyo (JP); Toshiyuki Odaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 40 days.

(21) Appl. No.: 17/609,938

(22) PCT Filed: Apr. 24, 2020

(86) PCT No.: PCT/JP2020/017676
§ 371 (c)(1),
(2) Date: Nov. 9, 2021

(87) PCT Pub. No.: WO2020/255560
PCT Pub. Date: Dec. 24, 2020

(65) Prior Publication Data
US 2022/0244719 A1 Aug. 4, 2022

(30) Foreign Application Priority Data

Jun. 20, 2019 (JP) ................................. 2019-114195

(51) Int. Cl.
*G05B 23/02* (2006.01)
(52) U.S. Cl.
CPC ..... *G05B 23/0283* (2013.01); *G05B 23/0281* (2013.01)
(58) Field of Classification Search
CPC ............ G05B 23/0221; G05B 23/0254; G05B 23/0281; G05B 23/0283
(Continued)

(56) References Cited

U.S. PATENT DOCUMENTS 5,764,509 A 6/1998 Gross et al.
2009/0217099 A1 8/2009 Kato
(Continued)

FOREIGN PATENT DOCUMENTS

JP 2000-505221 A 4/2000
JP 2003-208219 A 7/2003
(Continued)

OTHER PUBLICATIONS

Zhao et al., JP 201710263 A, "Preprocessor of Abnormality Sign Diagnosis Device and Processing Method of the Preprocessor", Date Published: Jan. 12, 2017 (Year: 2017).*
(Continued)

*Primary Examiner* — John H Le
(74) *Attorney, Agent, or Firm* — MATTINGLY & MALUR, PC (57) ABSTRACT

Sensor combinations that are effective for failure sign diagnosis are automatically generated in consideration of hidden relationships between sensor data. The present invention includes: a time shift data generation unit 106 that processes sensor data acquired from an instrument and generates the processed sensor data; and a sensor combinations/pre-processing condition generation unit 112 that generates sensor combinations on the basis of correlation coefficients between the sensor data and the processed sensor data, and generates, as a preprocessing condition, a processing condition that increases a correlation coefficient between sensors for each sensor combination, in which the failure sign diagnosis of the instrument is performed on the basis of a change in the relationship between the sensor data included in the sensor combination and the processed sensor data.

12 Claims, 7 Drawing Sheets

(58) Field of Classification Search
USPC .......................................................... 702/184
See application file for complete search history.

(56) References Cited

U.S. PATENT DOCUMENTS

| | | |
|---|---|---|
| 2012/0041575 A1 | 2/2012 | Maeda et al. |
| 2014/0288675 A1 | 9/2014 | Fujiwara et al. |
| 2016/0169771 A1 | 6/2016 | Hiruta et al. |
| 2016/0371137 A1 | 12/2016 | Zhao et al. |

FOREIGN PATENT DOCUMENTS

| | | |
|---|---|---|
| JP | 2004-78812 A | 3/2004 |
| JP | 2009-146086 A | 7/2009 |
| JP | 2009-199533 A | 9/2009 |
| JP | 2014-186631 A | 10/2014 |
| JP | 2017-010263 A | 1/2017 |

OTHER PUBLICATIONS

Yamazaki et al., JP 2003208219 A, "Abnormality Detecting Device and Method", Date Published: Jul. 25, 2003 (Year: 2003).*
Fujiwara et al., JP 2014186631 A, "Diagnosis Processing System, Terminal Equipment and Server", Date Published: Oct. 2, 2014 (Year: 2014).*
Nakajo, JP 2009146086 A, "Vehicle Failure Diagnosis/Prediction Device", Date Published:: Jul. 2, 2009 (Year: 2009).*
Suzuki et al., CN 102859457 B, "Time Sequence Data Diagnosis Compression Method", Date Published: Nov. 25, 2015 (Year: 2015).*
International Search Report of PCT/JP2020/017676 dated Jul. 14, 2020.
Japanese Office Action received in corresponding Japanese Application No. 2019-114195 dated Nov. 1, 2022.
Extended European Search Report received in corresponding European Application No. 20826014.1 dated Jun. 16, 2023.

* cited by examiner

| RECEPTION DATE AND HOUR |
| SENSOR ID |
| SENSOR VALUE |
| ... |

GENERATE PROCESSED SENSOR DATA SV (SHIFT AMOUNT) BY SHIFTING ORIGINAL SENSOR DATA S(t) IN FUTURE DIRECTION AND PAST DIRECTION IN BY TIME INCREMENT $\Delta T$ WITH MAXIMUM SHIFT AMOUNTS $\pm T_{max}$

FIG. 5

GENERATE VARIATION AMOUNT OF ORIGINAL SENSOR DATA S(t) - S(t-1) AS PROCESSED SENSOR DATA SV($\Delta T$)

| ITEM ID | SENSOR COMBINATION | PREPROCESSING CONDITION |
|---|---|---|
| 1 | (S1,S3,S5) | (0,-3,$\triangle$t) |
| 2 | (S2,S5,S6,S7) | (0,4,5,-2) |
| ... | ... | ... |

| NORMAL MODEL INFORMATION |
|---|
| DATA AMOUNT |
| S1: NORMAL AVERAGE VALUE $\mu_{S1}$ |
| S1: NORMAL STANDARD DEVIATION $\sigma_{S1}$ |
| SV3: NORMAL AVERAGE VALUE $\mu_{SV3}$ |
| SV3: NORMAL STANDARD DEVIATION $\sigma_{SV3}$ |
| SV5: NORMAL AVERAGE VALUE $\mu_{SV5}$ |
| SV5: NORMAL STANDARD DEVIATION $\sigma_{SV5}$ |

FAILURE SIGN DIAGNOSIS DEVICE AND METHOD THEREFOR

TECHNICAL FIELD

The present invention relates to technologies regarding preventive maintenance for preventing the failures, abnormalities, and malfunctions of instruments such as industrial instruments. Here, it is assumed that the preventive maintenance includes sign diagnosis, detection of failures and the like.

BACKGROUND ART

Instruments that are designed to fulfill predefined functions are required to fulfill these functions. For example, industrial instruments regarding productions such as manufacturing, electric power generation, physical distribution, resource drilling, and the like are usually required to operate normally as planned in order to maintain the productivities of the productions, so that unexpected sudden failures of these industrial instruments can result in reductions of production efficiencies and significant losses. In order to prevent such situations from occurring, the idea of preventive maintenance is widely recognized in which the signs of instrument failures are quickly detected and the relevant parts are replaced or maintained before the failures occur.

One of technologies for supporting this preventive maintenance is a failure sign diagnosis technology. This technology is a technology in which the operation state of an instrument is monitored and deviation from the normal state of the instrument is detected on the basis of measurement data (hereinafter, referred to as sensor data) related to temperature, pressure, and the like that are measured by various sensors installed in the instrument, so that an abnormal state of the instrument can be grasped before the failure of the instrument occurs. In recent years, high-performance methods for detecting slight changes in trends, which cannot be grasped by human senses, by statistically processing multidimensional data using machine learning have been devised. While the use of the machine learning can improve the performance of diagnosis, it is indispensable to select appropriate sensor items for various failure modes of the relevant machine. For example, even in the case where several thousands of sensors are installed in an instrument, if a combination of sensor items (hereinafter, referred to as a sensor combination) corresponding to a failure mode of the instrument desired to be detected is not appropriately selected, there is a possibility that the performance of diagnosis is deteriorated due to the influences of the states of irrelevant sensor data. Although, seasoned domain knowledge in this technological field is indispensable in order to generate this sensor combination, many data analysts (data scientists) do not have such knowledge, so that there has been a problem in that diagnostic performance varies depending on the abilities and knowledges of the analysts. In order to overcome such a situation, technologies for automatically generating an appropriate sensor combination regardless of the ability of an analyst are required.

As one of such technologies, a technology is disclosed, in which, after correlations between sensors are calculated on the basis of inputted sensor data and correlation models, and in each of which sensors that have a correlation with each other are linked are built, the occurrence of a failure is detected from the break of a correlation (PTL 1).

According to the above technology, because the correlation model themselves, in each of which sensors are linked with each other, can be considered sensor combinations, it is possible to realize the automatic generation of sensor combinations without depending on the abilities of analysts.

CITATION LIST

Patent Literature

PTL 1: Japanese Patent Application Laid-Open No. 2009-199533

SUMMARY OF INVENTION

Technical Problem

However, since attention is paid only to correlations among input sensor data themselves in the invention disclosed in PTL 1, there is a problem in that it is impossible to find associations in consideration of hidden relationships among sensors other than the above correlations. For example, in the case where sensor data collected in plural systems having clocks different from one another are processed in a lot, there is a possibility that there are time lags among the sensor data, so that it may be judged that there is no correlation between sensors that have essentially a correlation therebetween and a sensor combination may not be generated out of the above sensors. In addition, there is a case where, although there is originally no correlation between two sensors, if there is a relationship of derivation or integration between the two sensors, there is a case where a correlation arises by calculating the time variation amount of one of the two sensors. Therefore, a problem to be solved in the present invention is how to perform failure sign diagnosis in consideration of hidden relationships among sensors. It is considered that there is a "hidden relationship" between the two sensors, and a relationship on which an aggressive cover-up work is not carried out can also be considered a hidden relationship. For example, even if relationships (candidate relationships) among sensors are manifestly shown in advance, there may be some relationships that need to be determined whether the relationships can be used or not. Furthermore, relationships generated by correcting the abovementioned time lags or relationships generated by correcting measurement delays are also considered hidden relationships.

Solution to Problem

The present invention has been achieved to solve the abovementioned problem. In other words, the present invention generates a preprocessing condition that increases a correlation regarding a correlation coefficient between sensor data and processed sensor data obtained by processing the sensor data, and updates a diagnosis model on the basis of the generated preprocessing condition. Here, it is more preferable to generate a preprocessing condition that makes the correlation maximum.

In addition, to use a correlation coefficient for each sensor combination or to calculate this also falls within an embodiment of the present invention.

As the concrete configuration of an embodiment of the present invention, the following will be exemplified.

A failure sign diagnosis device including: processed sensor data generation means for generating processed sensor data by performing processing on sensor data obtained from an instrument; preprocessing condition generation means for generating processing conditions that increase correlation coefficients between sensors as preprocessing conditions; failure sign diagnosis model update means for updating a failure sign diagnosis model of the instrument on the basis of the preprocessing conditions; and diagnosis processing means for performing failure sign diagnosis on the instrument using the failure sign diagnosis model.

Furthermore, it is also an example of the present invention that the failure sign diagnosis device further includes sensor combination generation means for generating sensor combinations on the basis of correlation coefficients between the sensor data and the processed sensor data, and the preprocessing condition generation means generates the preprocessing condition for each of the sensor combinations generated by the sensor combination generation means.

It is also an example of the present invention that the failure sign diagnosis of the instrument performed by the diagnosis processing means is performed on the basis of changes of relationships between the sensor data and the processed sensor data.

In addition, it is also conceivable that the failure sign diagnosis model update means generates the failure sign diagnosis model.

Furthermore, programs for performing various functions of the failure sign diagnosis device, media for storing these programs, and methods for performing the various functions also fall within the scope of the present invention.

Advantageous Effects of Invention

According to the present invention, preventive maintenance can be performed in consideration of correlations between sensor data themselves and hidden relationships between the sensor data.

DESCRIPTION OF EMBODIMENTS

One example of the present invention will be explained with reference to the accompanying drawings.

Figure 1:
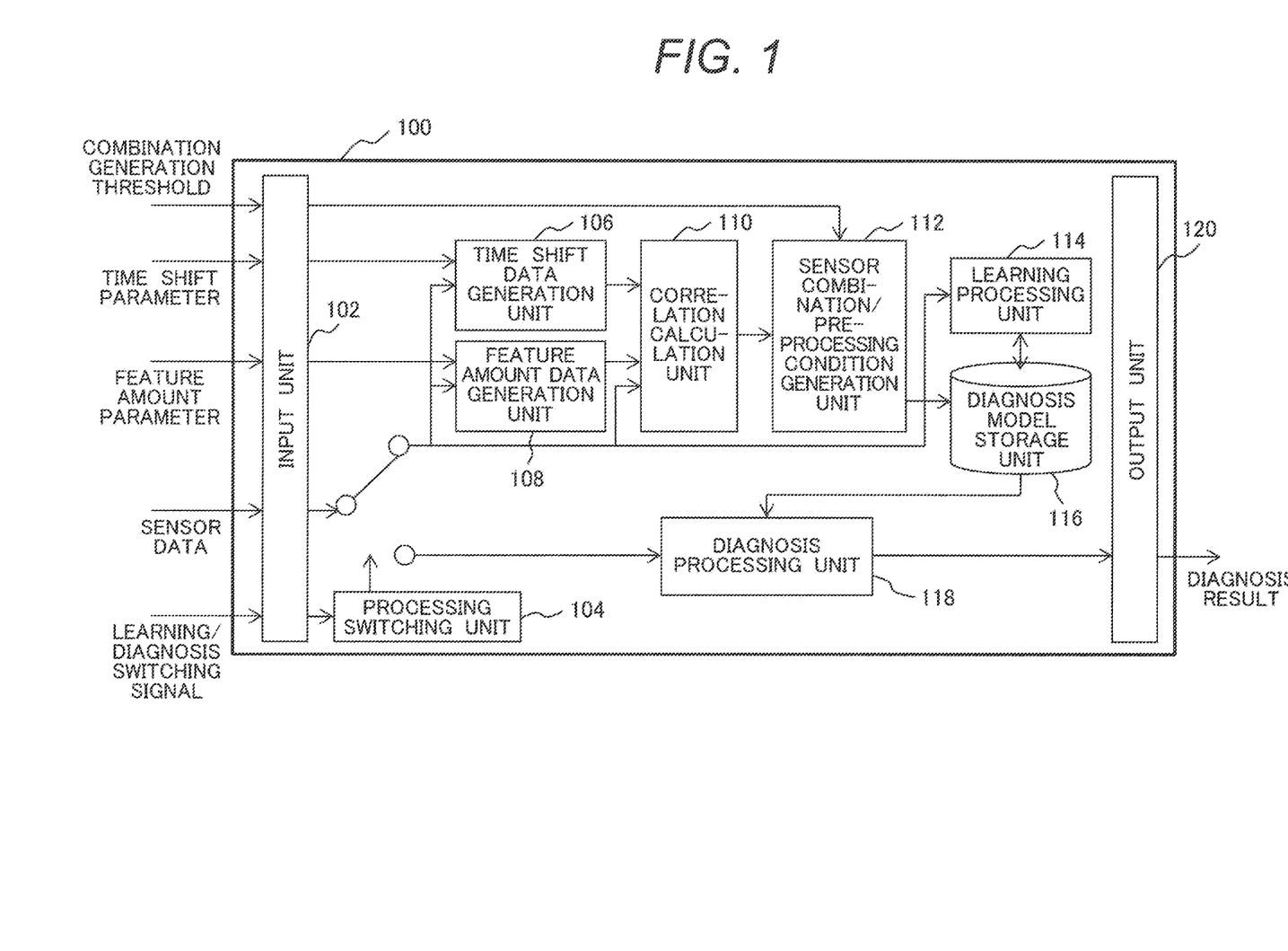
FIG. 1 shows the entire configuration of a failure sign diagnosis device 100 according to one example of the present invention.

FIG. 1 shows a configuration example of a failure sign diagnosis device 100 to which this example is applied. As shown in FIG. 1, the failure sign diagnosis device 100 includes: an input unit 102; a processing switching unit 104; a time shift data generation unit 106; a feature amount data generation unit 108; a correlation calculation unit 110; a sensor combination/preprocessing condition generation unit 112; a learning processing unit 114; a diagnosis model storage unit 116; a diagnosis processing unit 118; and an output unit 120.

The input unit 102 receives sensor data measured by sensors installed in an unshown instrument via various input interfaces, and at the same time, the input unit has a function to receive parameters.

The processing switching unit 104 has a function to switch the input direction of the sensor data from a learning processing side to a diagnosis processing side or vice versa on the basis of a learning/diagnosis switching signal received via the input unit 102.

The time shift data generation unit 106 generates time shift data out of sensor data, which is received via the input unit 102, by shifting the time of the sensor data gradually in the past and the future directions using time shift parameters.

The feature amount data generation unit 108 generates feature amount data (for example, variation amount data that show time differences and statistical data such as average values and variances within a sliding window) obtained by calculation using feature amount parameters out of the sensor data received via the input unit 102.

The correlation calculation unit 110 performs processing for calculating correlation coefficients between the original sensor data received via the input unit 102 and processed sensor data such as the time shift data outputted from the time shift data generation unit 106, the feature amount data outputted from the feature amount data generation unit 108, and the like (hereinafter, referred to as the processed sensor data).

The sensor combination/preprocessing condition generation unit 112 generates sensor combinations by combining sensors correlation coefficients which are high in consideration of the calculation result of the correlation coefficients outputted from the correlation calculation unit 110 and combination generation thresholds received via the input unit 102, and at the same time, generates preprocessing conditions out of processing conditions that increase the correlations, and updates a diagnosis model corresponding to a processing procedure stored in the diagnosis model storage unit 116.

Here, in this example, the generation of the sensor combinations and the generation of the preprocessing conditions by the sensor combination/preprocessing condition generation unit 112 may be executed separately by two configurations, or the sensor combination/preprocessing condition generation unit 112 may have either one of the two functions.

The learning processing unit 114 calculates a normal average value and a normal standard deviation out of sensor data inputted via the input unit 102 as the feature amounts of the normal state of the instrument, and updates the diagnosis model stored in the diagnosis model storage unit 116.

The diagnosis processing unit 118 performs abnormality judgment processing on the sensor data received via the input unit 102 on the basis of the diagnosis model stored in the diagnosis model storage unit 116, and outputs a diagnosis result via the output unit 120.

Figure 2:
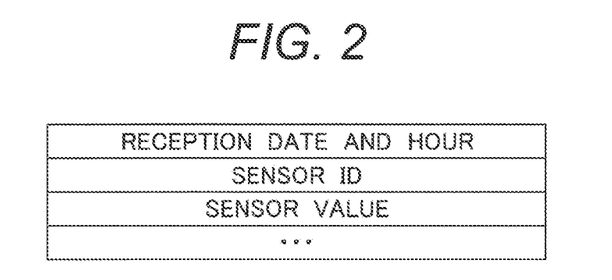
FIG. 2 shows an example of a configuration of sensor data used in one example of the present invention.

FIG. 2 shows an example of a configuration of sensor data. As shown in FIG. 2, the configuration of sensor data received by the input unit 102 is composed of a reception date and hour, and combinations of sensor IDs, and sensor values. This configuration shows the configuration of a record at a time instant, and it becomes possible to generate time series data by combining plural records. In the failure sign diagnosis device 100 shown in FIG. 1, it is assumed that time series data composed of plural records are inputted as inputted sensor data.

Figure 3:
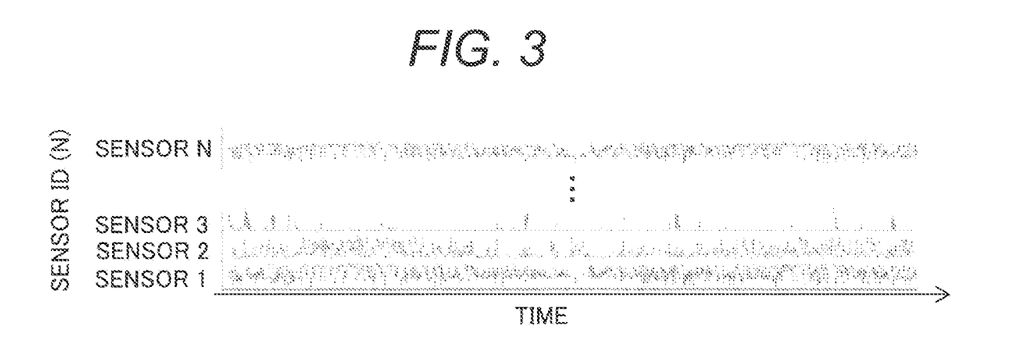
FIG. 3 shows examples of time series of sensor data used in one example of the present invention.

FIG. 3 shows examples of time series data of sensor data. In FIG. 3, it is assumed that the number of the types of the sensor IDs is N, and time series data is shown for each sensor ID. This time series data is represented by time in the horizontal axis and by measured values for each sensor in the vertical axis. In FIG. 3, time series data is represented by a line graph, and basically, each point composing this line graph represents one record of sensor data shown in FIG. 2. In the failure sign diagnosis device 100 shown in FIG. 1, although it is assumed that time series data of sensor data is inputted as shown in FIG. 3, the time resolution, the unit of range/period of the time series data should be determined depending on an instrument subject to the diagnosis and the time resolution of the relevant sensor data. For example, in the case of an instrument the functions of which gradually deteriorate such as a windmill, a time resolution of about one second is sufficient, and when learning processing is performed, sensor data for several days or for several months is inputted in a lot to generate a diagnosis model, and when diagnosis processing is performed, sensor data for several hours or for one day is inputted. On the other hand, when a machine in which an abnormality that shows a failure sign appears several hours ago such as a cutting machine is subject to failure diagnosis, the time resolution for the machine needs to be a millisecond order to a nanosecond order, and data for several hours or several days is necessary for learning processing. On the other hand, since it is desirable that diagnosis processing for the machine should be performed at time intervals almost equal to the time intervals of real-time processing, data for about one second to one minute should be inputted in a lot.

Figure 4:
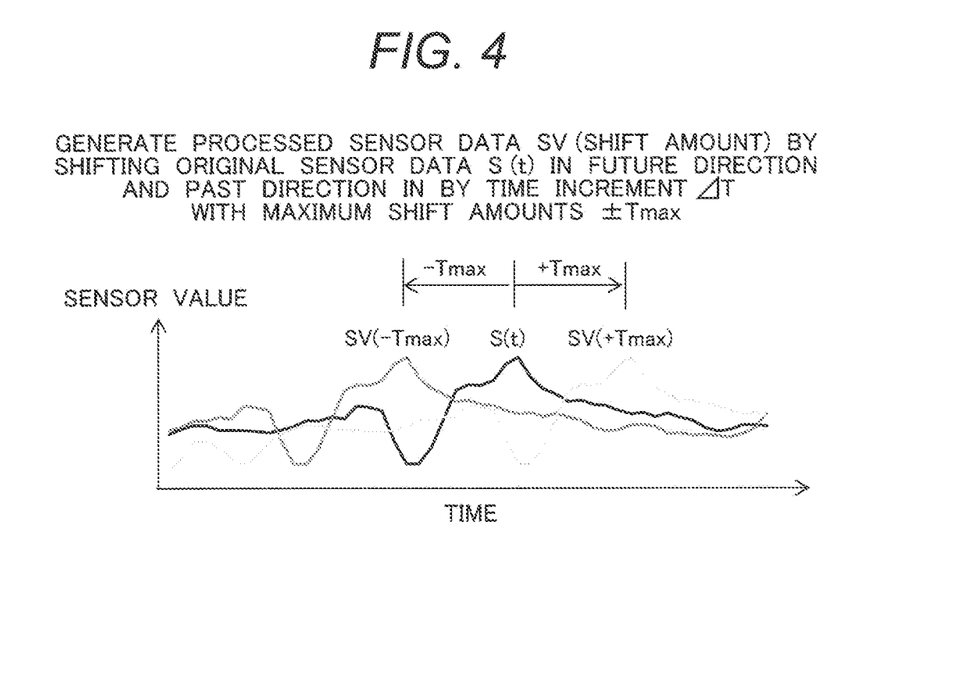
FIG. 4 shows an example of processing performed by a time shift data generation unit 106 according to one example of the present invention.

Next, the processing contents of the time shift data generation unit 106 will be explained with reference to FIG. 4. The time shift data generation unit 106 receives a time increment $\Delta T$ and a maximum shift amount Tmax as time shift parameters. Assuming that one inputted sensor data piece is represented by $S(t)$, time shift data is generated by shifting $S(t)$ in the past direction and the future direction in steps of a time increment $\Delta T$. Here, it will be assumed that time shift data obtained by shifting $S(t)$ in the past direction by $\Delta T$ is represented by $SV(-\Delta T)=S(t-\Delta T)$, and time shift data obtained by shifting $S(t)$ in the future direction by $\Delta T$ is represented by $SV(+\Delta T)=S(t+\Delta T)$. Taking the maximum shift amount Tmax into consideration, processed sensor data pieces $SV(-\Delta T), SV(-2\Delta T), \ldots, SV(-Tmax)$, the number of which is $Tmax/\Delta T$, are generated in the past direction out of $S(t)$, and processed sensor data pieces $SV(+\Delta T), SV(+2\Delta T), \ldots, SV(+Tmax)$, the number of which is $Tmax/\Delta T$, are generated in the future direction out of $S(t)$. $2(Tmax/\Delta T)+1$ time shift data pieces are generated out of one sensor data piece $S(t)$ including $SV(0)=S(t)$. The processing of the time shift data generation unit 106 is finished after the time shift data generation unit 106 performs the abovementioned processing on sensor data obtained by all N sensors (N is the number of the sensors).

Figure 5:
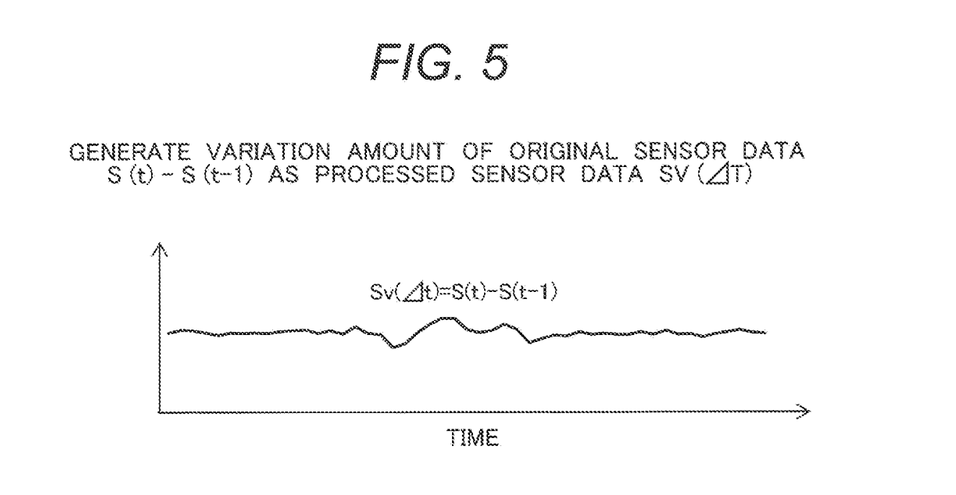
FIG. 5 shows an example of processing performed by a feature amount data generation unit 108 (an example of a calculation of a variation amount) according to one example of the present invention.

Next, the processing contents of the feature amount data generation unit 108 will be explained. The feature amount data generation unit 108 receives information about the kinds of calculations and parameter information necessary for the calculations as feature amount parameters. The information about the kinds of calculations is information about what are calculated as feature amounts, and for example, the feature amounts include (1) a variation amount, (2) an average value, and (3) a variance.

The case where the feature amount data generation unit 108 calculates (1) a variation amount will be described with reference to FIG. 5. The feature amount data generation unit 108 calculates a difference between the sensor data $S(t)$ and $S(t-1)$ which is a previous value in terms of time in the case of calculating (1) a variation amount. Here, this variation amount data piece $SV(\Delta t)$ is represented as one kind of processed sensor data. The processing of the feature amount data generation unit 108 is finished after the feature amount data generation unit 108 performs the abovementioned processing on the sensor data obtained by all the N sensors (N is the number of the sensors). On the other hand, when the feature amount data generation unit 108 receives (2) an average value and (3) a variance as the information about the kinds of calculations, the feature amount data generation unit 108 also receives a window width tw as parameter information necessary for the calculations. The feature amount data generation unit 108 then calculates statistical amounts, that is, (2) an average value and (3) a variance, out of data between target times t and t-tw, and outputs the average and the variance as feature amount data. Although an average and a variance, which are the most typical statistical amounts, are calculated in this case, it is conceivable that a gradient is calculated by regression analysis or moments such as a skewness or a kurtosis, which represent the features of a distribution, are outputted as feature amounts.

Figure 6:
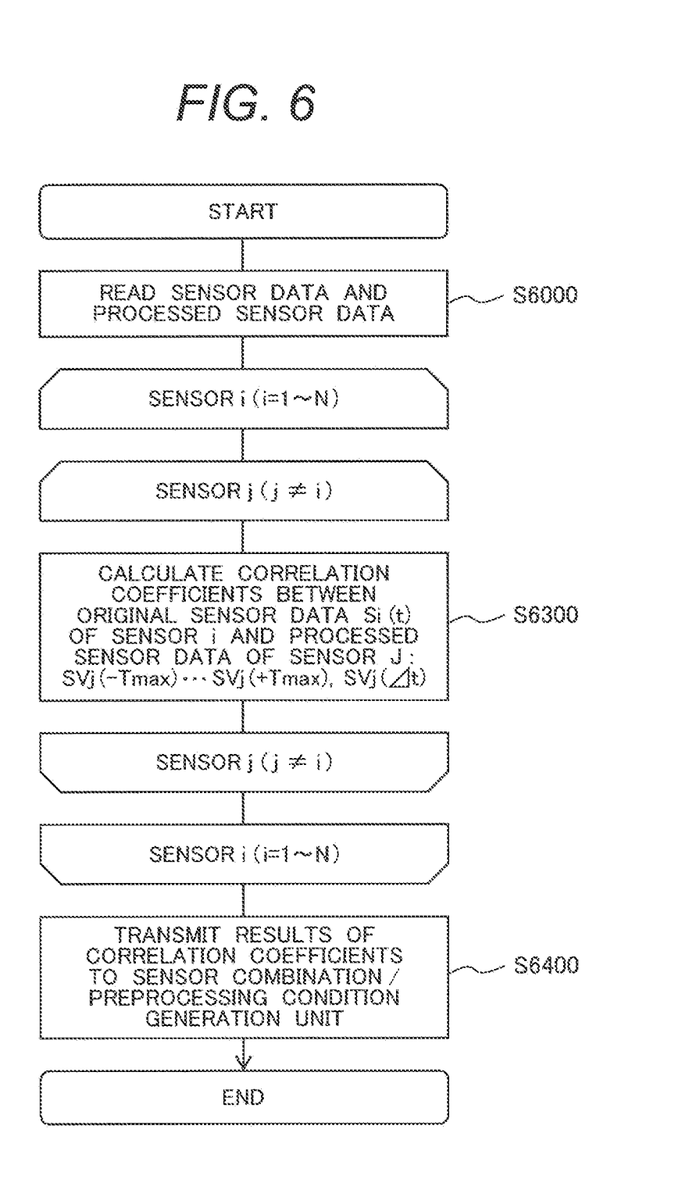
FIG. 6 shows an example of a processing flow of a correlation calculation unit 110 according to one example of the present invention.

Next, the processing procedure of the correlation calculation unit 110 will be explained with reference to FIG. 6.

First, at S6000, the correlation calculation unit 110 receives the original sensor data_from the input unit 102, and at the same time, the correlation calculation unit 110 receives the processed sensor data from the time shift data generation unit 106 and the feature amount data generation unit 108.

Subsequently, at S6300, the correlation calculation unit 110 calculates correlation coefficients between original sensor data of a sensor i (i=1, ..., N) and processed sensor data_of a sensor j (j=1, ..., N, i≠j).

Hereinafter, it will be assumed that the correlation coefficients between the sensor data $S1(t)$ and the processed sensor data $SVj(-Tmax), \ldots, SVj(Tmax)$, and $SVj(\Delta t)$ are respectively represented as $Rij(-Tmax), \ldots, Rij(Tmax)$, and $Rij(\Delta t)$ (i, j=1, ..., N, i≠j). Here, the correlation coefficients may be calculated by using other methods. Sample correlation coefficients (Pearson product-moment correlation coefficients) or rank correlation coefficients may be used.

Lastly, at S6400, the processing of the correlation calculation unit 110 is finished after the correlation calculation unit 110 transmits the calculation results of all the correlation coefficients calculated at S6300 to the sensor combination/preprocessing condition generation unit 112.

Figure 7:
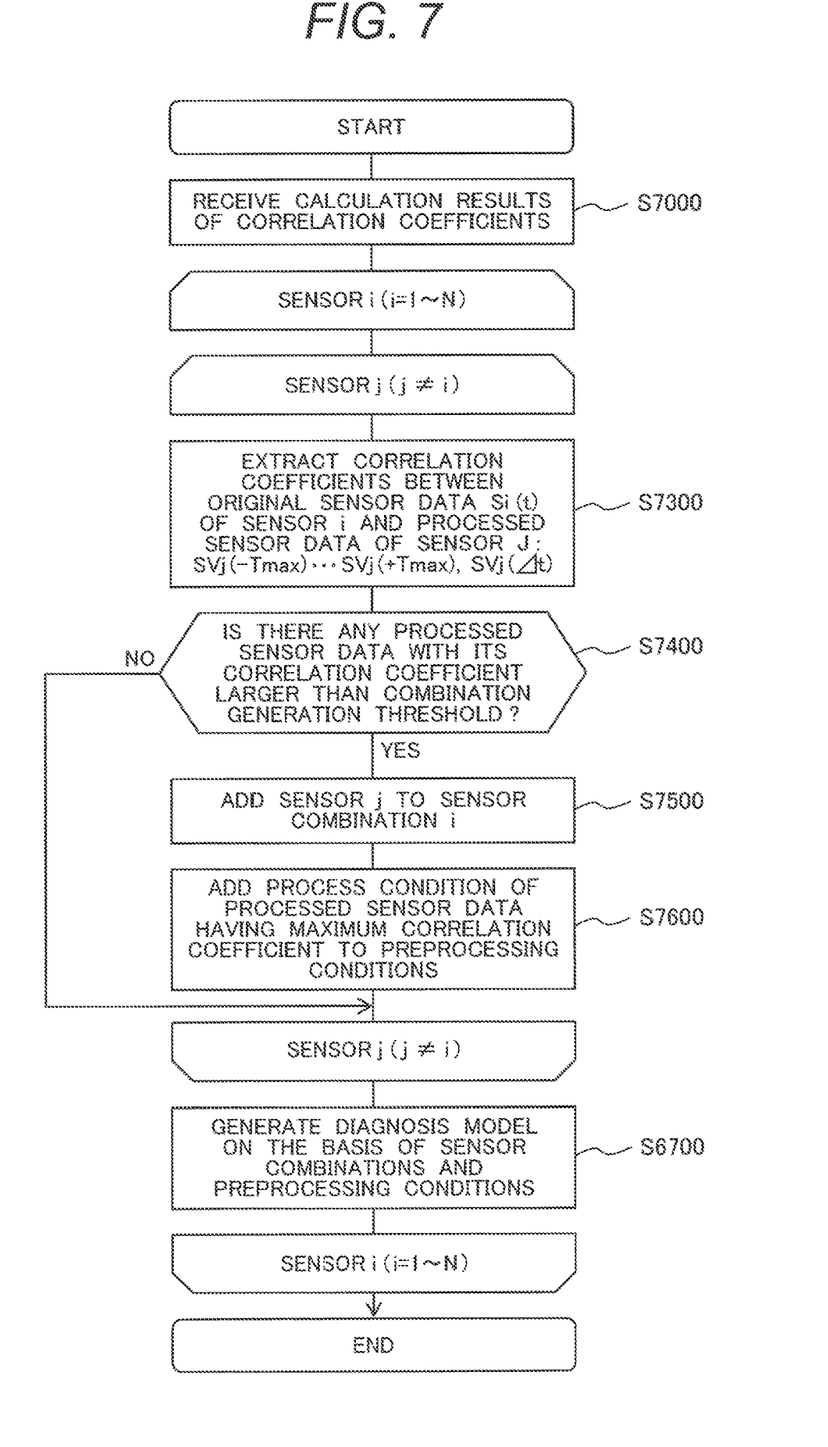
FIG. 7 shows an example of a processing flow of a sensor combination/preprocessing condition generation unit 112 according to one example of the present invention.

Next, the processing procedure of the sensor combination/preprocessing condition generation unit 112 will be explained with reference to FIG. 7.

First, at S7000, the sensor combination/preprocessing condition generation unit 112 receives the calculation results of the correlation coefficients from the correlation calculation unit 110.

Next, at S7300, the sensor combination/preprocessing condition generation unit 112 extracts the calculation results Rij(−Tmax), . . . , Rij(Tmax), SVj(Δt) (i, j=1∼N, i≠j) of the correlation coefficients between the original sensor data piece Si(t) of the sensor i (i=1∼N) and the processed sensor data SVj(−Tmax), . . . , SVj(Tmax), SVj(Δt) of the sensor j (j=1∼N, i≠j).

At S7400, a combination generation threshold received from the input unit 102 as a parameter and each of the calculation results Rij(−Tmax), . . . , Rij(Tmax), SVj(Δt) (i, j=1∼N, i≠j) of the correlation coefficients extracted at S7300 are compared with each other, and if there is any correlation coefficient larger than the combination generation threshold, the judgment at S7400 is YES, and the flow proceeds to S7500, and if all the correlation coefficients are equal to or smaller than the combination generation threshold, the judgment at S7400 is NO, and the flow proceeds to processing on the next sensor j (j=1∼N, i≠j).

In the case where the judgment at S7400 is YES, the sensor combination/preprocessing condition generation unit 112 adds the sensor j to a sensor combination i. Here, the sensor combination i is a combination obtained by grouping sensors each of which has a correlation with the sensor i. As a result, if there is no processed sensor data the correlation coefficient of which is larger than the combination generation threshold among the processed data of the sensor j, the sensor combination i includes only the sensor i, so that the sensor combination i is not generated. On the other hand, if there is a sensor j the correlation coefficient of which is larger than the combination generation threshold, the sensor combination i includes the sensor j, so that the sensor j is registered as a sensor by performing processing on which a correlation occurs.

Next, at S7600, the sensor combination/preprocessing condition generation unit 112 registers a processing condition that provides the maximum correlation coefficient of correlation coefficients larger than the combination generation threshold in Preprocessing Condition. To put it concretely, assuming that Rij(Tmax) is the largest of the correlations Rij(−Tmax), . . . , Rij(Tmax), and Rij(Δt), Tmax is a processing condition of the sensor j corresponding to the maximum correlation coefficient, and Tmax is registered in Preprocessing Condition.

When, at S6700, the comparison of the correlation coefficients between the sensor i and the processed sensor data of all the sensor j is finished, the contents of the sensor combination i and preprocessing conditions are registered in the diagnosis model stored in the diagnosis model storage unit 116.

Figure 8:
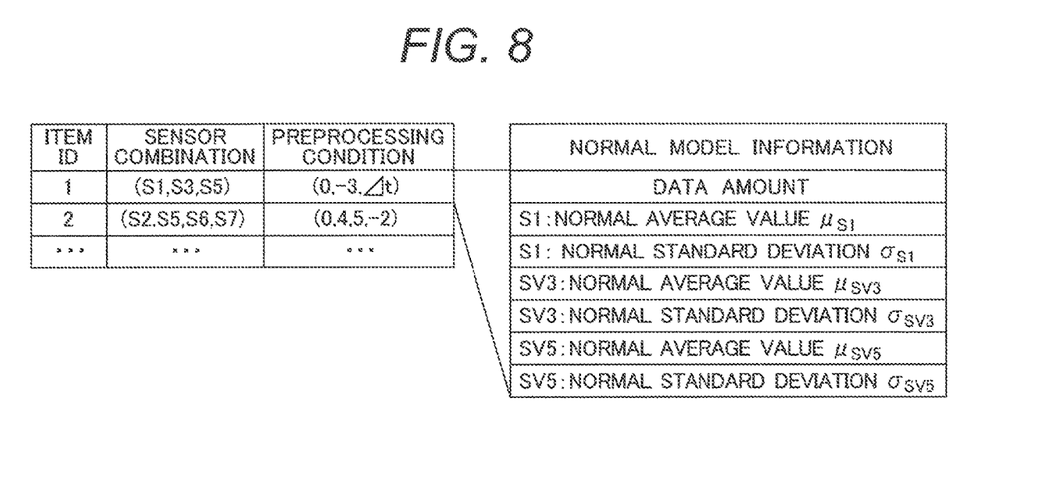
FIG. 8 shows a configuration example of a diagnosis model used in one example of the present invention.

FIG. 8 shows a configuration example of a diagnosis model. The diagnosis model includes a sensor combination, a preprocessing condition, and normal model information for each item ID corresponding a sensor ID i. In this diagnosis model, the results of a sensor combination i are registered in Sensor Combination and Preprocessing Condition of a term ID=i. Since the normal model information shows contents outputted by the after-mentioned learning processing unit 114, explanations about the normal model information are omitted here. In FIG. 8, a sensor combination and a preprocessing condition of ITEM ID=1 are (S1, S3, S5) and (0, −3, Δt) respectively, which means that sensors having correlation with a sensor 1 are a sensor 3 and a sensor 5, and a processing condition for the sensor 1 is a time shift 0 [sec], a processing condition for the sensor 3 is a time shift −3 [sec], and a variation amount is taken up for the sensor 5. In addition, as for ITEM ID=2, a sensor combination and a preprocessing condition of ITEM ID=2 are (S2, S5, S6, S7) and (0, 4, 5, −2) respectively, which means that sensors having correlation with a sensor 2 are the sensor 5, a sensor 6, and a sensor 7, and a processing condition for the sensor 5 is a time shift 4 [sec], a processing condition for the sensor 6 is a time shift 5 [sec], a processing condition for the sensor 7 is a time shift −2 [sec].

The processing of the sensor combination/preprocessing condition generation unit 112 is finished after the sensor combination/preprocessing condition generation unit 112 performs the abovementioned processing on all sensor i.

Figure 9:
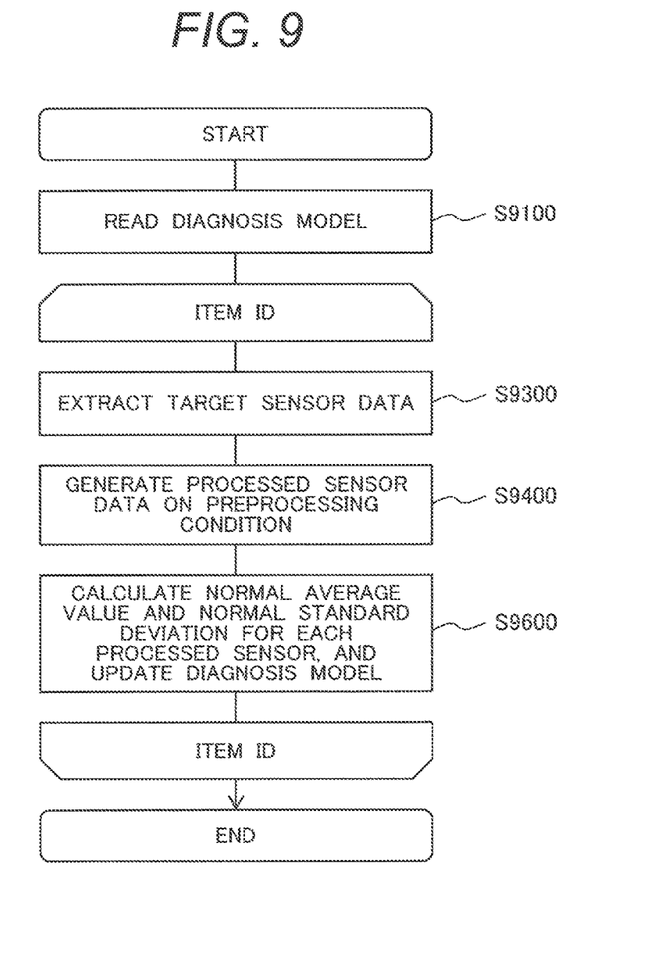
FIG. 9 shows an example of a processing flow of a learning processing unit 114 according to one example of the present invention.

Next, the processing contents of the learning processing unit 114 will be explained with reference to FIG. 9.

First, at S9100, the learning processing unit 114 reads the contents of the diagnosis model stored in the diagnosis model storage unit 116 shown in FIG. 8.

At S9300, the learning processing unit 114 extracts sensor data registered in Sensor Combination of the diagnosis model for each item ID out of sensor data received from the input unit 102.

At S9400, the learning processing unit 114 performs processing on target sensor data according to a processing condition registered in Preprocessing Condition of the diagnosis model. For example, in the case of ITEM ID=1 of the diagnosis model shown in FIG. 8, there are sensors S1, S3, and S5 in Sensor Combination, and time shift processing with a shift time 0 [sec] is performed on the sensor data piece of the sensor S1, time shift processing with a shift time −3 [sec] is performed on the sensor data of the sensor S3. And variation amount calculation is performed on the sensor data of the sensor 5. Three processed sensor data obtained in the above calculation are abbreviated and treated as S1, SV3, and SV5 respectively.

Next, at S9600, the processing of the learning processing unit 114 is finished after the processing of the learning processing unit 114 calculates normal average values and normal standard deviations out of the processed data S1, SV3, and SV5 generated at S9400 and updates the normal model information of the diagnosis model.

Figure 10:
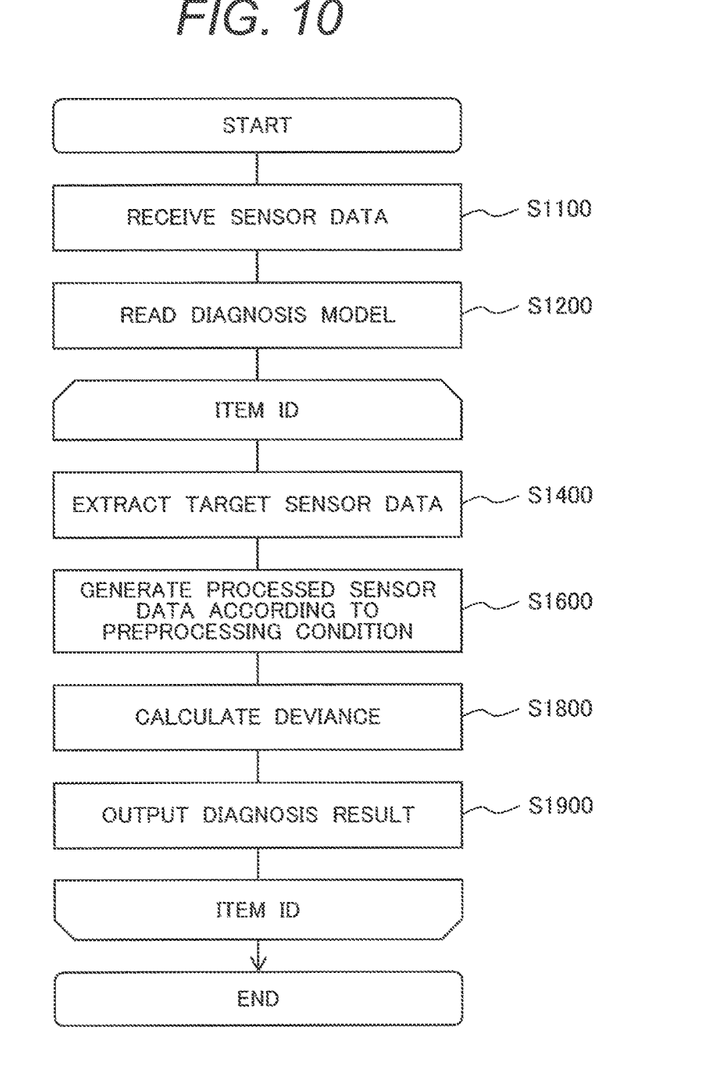
FIG. 10 shows an example of a processing flow of a diagnosis processing unit 118 according to one example of the present invention.

Next, the processing contents of the diagnosis processing unit 118 will be explained with reference to FIG. 10.

First, at S1100, the diagnosis processing unit 118 receives sensor data from the input unit 102.

Next, at S1200, the diagnosis processing unit 118 read the diagnosis model stored in the diagnosis model storage unit 116.

The diagnosis processing unit 118 repeats processing at S1400 to S1900 for each item ID of the diagnosis model.

First, at S1400, the diagnosis processing unit 118 extract sensor data registered in Sensor Combination of the diagnosis model.

Next, at S1600, the diagnosis processing unit 118 generates processed sensor data according to a preprocessing condition of the diagnosis model. At this processing, the same processing as the processing at S9400 of the learning processing unit 114 is performed.

Next, at S1800, the diagnosis processing unit 118 calculates a deviance on the basis of the processed sensor data generated at S1600 and the normal model information of the diagnosis model. The calculation of a deviance will be explained below. It will be assumed that processed sensor data at time t is SVa(t) (a=1, 2, . . . , m), where m is the number of sensors registered in ITEM ID. Assuming that a normal average value and a normal standard deviation registered in the diagnosis model are respectively μa and σa (a=1, 2, ..., m), a deviance L(t) at time t is calculated by Equation 1.

[Equation 1]

$$L(t) = \sqrt{\sum_{a=1}^{m}\left(\frac{SV_a(t) - \mu_a}{\sigma_a}\right)^2}$$ (Equation 1)

At S1900, the diagnosis processing unit 118 outputs a diagnosis result via the output unit 120.

Figure 11:
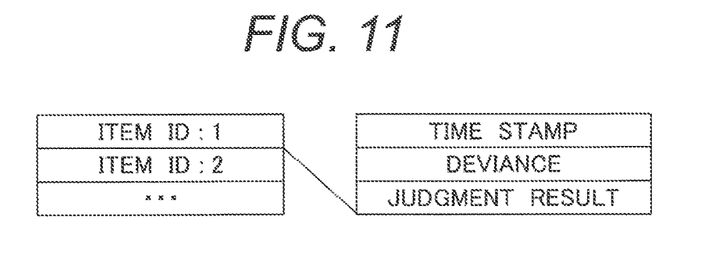
FIG. 11 shows a configuration example of a diagnosis result according to one example of the present invention.

FIG. 11 shows a configuration example of a diagnosis result. As shown in FIG. 11, the diagnosis result is composed of a time stamp, a deviance, and a judgment result for each item ID. The time stamp means time t, and the calculation result of L(t) is outputted as the deviance. Assuming it is normal that L(t) falls within −3σ and +3σ in a normal distribution, the judgment result becomes abnormal if L(t)>3. The processing of the diagnosis processing unit 118 is finished after the diagnosis processing unit 118 records the judgment result that is normal or abnormal on the basis of the above result and outputs the judgment result via the output unit 120.

REFERENCE SIGNS LIST

100 ... Failure Sign Diagnosis Device, 102 ... Input Unit, 104 ... Processing Switching Unit, 106 ... Time Shift Data Generation Unit, 108 ... Feature Amount Data Generation Unit, 110 ... Correlation Calculation Unit, 112 ... Sensor Combination/Preprocessing Condition Generation Unit, 114 ... Learning Processing Unit, 116 ... Diagnosis Model Storage Unit, 118 ... Diagnosis Processing Unit, 120 ... Output Unit

The invention claimed is:

1. A failure sign diagnosis device for performing failure sign diagnosis on an instrument using sensor data obtained from the instrument with the use of a plurality of sensors, comprising:
   processed sensor data generation means for generating processed sensor data by performing processing on the sensor data;
   preprocessing condition generation means for generating processing conditions for the processing that increases correlation coefficients between the plurality of sensors as preprocessing conditions;
   failure sign diagnosis model update means for updating a failure sign diagnosis model of the instrument on the basis of the preprocessing conditions;
   diagnosis processing means for performing failure sign diagnosis on the instrument using the failure sign diagnosis model; and
   sensor combination generation means for generating sensor combinations on the basis of correlation coefficients between the sensor data and the processed sensor data,
   wherein the preprocessing condition generation means generates the preprocessing condition for each of the sensor combinations generated by the sensor combination generation means.

2. The failure sign diagnosis device according to claim 1, further comprising:
   learning means for calculating average values and standard deviations during a specified period out of processed sensor data processed on the processing conditions in which the preprocessing conditions are reflected as normal models with reference to the sensor data of the sensor combinations,
   wherein the diagnosis processing means performs abnormality judgments on the basis of deviances from the normal models.

3. The failure sign diagnosis device according to claim 1, wherein the diagnosis processing means performs the failure sign diagnosis on the instrument on the basis of changes of relationships between the sensor data and the processed sensor data.

4. The failure sign diagnosis device according to claim 1, wherein the preprocessing condition generation means generates process conditions that make the correlation coefficients between the plurality sensors the highest as the preprocessing conditions.

5. The failure sign diagnosis device according to claim 1, wherein the processed sensor data generation means performs two pieces of processing, one of which is performed with the time shifted in the past direction and the other of which is performed with the time shifted in the future direction, on the sensor data to generate the processed sensor data.

6. The failure sign diagnosis device according to claim 1, wherein the processed sensor data generation means performs processing in which statistical values are calculated within a designated window on the sensor data to generate the processed sensor data.

7. A failure sign diagnosis method for performing failure sign diagnosis on an instrument using sensor data obtained from the instrument with the use of a plurality of sensors, comprising the steps of:
   generating processed sensor data by performing processing on the sensor data;
   generating processing conditions for the processing that increases correlation coefficients between the plurality of sensors as preprocessing conditions;
   updating a failure sign diagnosis model of the instrument on the basis of the preprocessing condition;
   performing failure sign diagnosis on the instrument using the failure sign diagnosis model; and
   generating sensor combinations on the basis of correlation coefficients between the sensor data and the processed sensor data,
   wherein the generating of the processing conditions includes generating the preprocessing condition for each of the generated sensor combinations.

8. The failure sign diagnosis method according to claim 7, further comprising the step of:
   calculating average values and standard deviations during a specified period out of processed sensor data processed on processing conditions in which the preprocessing conditions are reflected as normal models with reference to the sensor data of the sensor combinations,
   wherein the failure sign diagnosis of the instrument performs abnormality judgments on the basis of deviances from the normal models.

9. The failure sign diagnosis method according to claim 7 further comprising the step of:
   performing the failure sign diagnosis on the instrument on the basis of changes of relationships between the sensor data and the processed sensor data.

10. The failure sign diagnosis method according to claim 7 further comprising the step of:
   generating process conditions that make the correlation coefficients between the plurality sensors the highest as the preprocessing conditions.

11. The failure sign diagnosis method according to claim 7 further comprising the step of:
performing two pieces of processing, one of which is performed with the time shifted in the past direction and the other of which is performed with the time shifted in the future direction, on the sensor data to generate the processed sensor data.

12. The failure sign diagnosis method according to claim 7 further comprising the step of:
performing processing in which statistical values are calculated within a designated window on the sensor data to generate the processed sensor data.

* * * * *